US006856417B2

(12) United States Patent
Hibma

(10) Patent No.: US 6,856,417 B2
(45) Date of Patent: Feb. 15, 2005

(54) SYSTEM FOR DISTRIBUTING NEWSPAPERS

(75) Inventor: Geertrui Maria Wilhelmina Hibma, Weesp (NL)

(73) Assignee: PEPC World Wide N.V., the Hague (NL)

( * ) Notice: Subject to any disclaimer, the term of this patent is extended or adjusted under 35 U.S.C. 154(b) by 202 days.

(21) Appl. No.: 09/759,462

(22) Filed: Jan. 16, 2001

(65) Prior Publication Data

US 2002/0093672 A1 Jul. 18, 2002

(51) Int. Cl.[7] .................................................. G06K 15/00
(52) U.S. Cl. ................. 358/1.15; 358/1.18; 379/100.01
(58) Field of Search ................................ 358/1.15, 1.6, 358/1.12, 1.18, 468, 443; 707/7; 709/129, 136, 142; 379/100.01

(56) References Cited

U.S. PATENT DOCUMENTS

| | | | | |
|---|---|---|---|---|
| 4,528,643 A | | 7/1985 | Freeny, Jr. | 364/900 |
| 6,177,934 B1 | * | 1/2001 | Sugiura | 345/335 |
| 6,418,402 B1 | * | 7/2002 | King | 704/8 |
| 6,473,728 B1 | * | 10/2002 | Tognazzini | 704/3 |

FOREIGN PATENT DOCUMENTS

| | | | |
|---|---|---|---|
| JP | 2001338188 | * 12/2001 | G06F/17/60 |

* cited by examiner

*Primary Examiner*—Jerome Grant, II
(74) *Attorney, Agent, or Firm*—Young & Thompson

(57) ABSTRACT

System for distribution of a periodical document to at least one outlet, including a server arrangement (2), at least one outlet computer arrangement (6, 7), the server arrangement (2) being arranged to communicate with the at least one outlet computer arrangement (6, 7) through a network (1), and the server arrangement (2) is arranged for sending an electronic copy of the periodical document to fie at least one outlet computer arrangement (6, 7), the electronic copy includes the content of the periodical document and information of a predetermined format for the periodical document, and the at least one outlet computer arrangement (6, 7) is arranged for:

receiving the electronic copy of the periodical document from the server arrangement (2), and printing a copy of the periodical document from the electronic copy on a request of a customer using the predetermined format for the periodical document.

6 Claims, 7 Drawing Sheets

SYSTEM FOR DISTRIBUTING NEWSPAPERS

FIELD OF THE INVENTION

The present invention relates to a system for distributing periodical documents as defined in the preamble of claim 1.

PRIOR ART

Distributing periodical documents such as newspaper publications and magazines to points of sale or subscriber addresses requires a complicated logistic operation. After producing a newspaper edition at the printer, a large number of newspapers has to be distributed to newsvendors and newspaper stands. Often, the distribution to locations with a low volume of trade, or located at a remote location, may be relatively costly. Especially, the world-wide distribution of national and international newspapers to such outlets at hotels, hospitals, and airports may be prohibitively expensive date to the relatively high transportation costs.

Also, since the content of a newspaper ages quickly, the distribution requires fast transportation. From the prior at it is known, that many newspapers appear in an adapted weekly edition for sale at remote locations.

Further, the financial settlement of such small sales-volumes may be burdensome as well.

From the prior art electronic newspapers are known which can be accessed (mostly free) through the Internet. However, reading a newspaper from the display of a computer system may not be very comfortable. Also, potential customers, such as travellers staying at a hotel, may not have access to a computer. Moreover, the profitability of an electronic edition of a newspaper is questionable; therefore, some electronic newspapers require a reader to subscribe.

SUMMARY OF THE INVENTION

It is a object of the present invention to provide a system and a method for distributing newspapers and similar documents which overcome the disadvantages of the distribution systems of the prior art.

The present invention relates to a system for distribution of a periodical document to at least one outlet, comprising a server arrangement, at least one outlet computer arrangement, the server arrangement being arranged to communicate with at least one outlet computer arrangement through a network, wherein the server arrangement is arranged for sending data comprising a electronic copy of the periodical document to the at least one outlet computer arrangement, the electronic copy comprises the content of the periodical document and information of a predetermined print format for the periodical document, and the at least one outlet computer arrangement is arranged for:

receiving the data comprising the electronic copy of the periodical document from the server arrangement, and printing a copy of the periodical document from the electronic copy of the periodical document on a request of a customer using the predetermined print format for the periodical document, Also, the present invention relates to a method for distribution of a periodical document by a system, as described above, comprising the following steps:

to send by the server arrangement data comprising an electronic copy of the periodical document to the at least one outlet computer arrangement, wherein the electronic copy comprises the content of the periodical document and information of a predetermined print format for the periodical document, to receive by the at least one outlet computer arrangement the data comprising the electronic copy of the periodical document from the server arrangement, and to print by the at least one outlet computer arrangement a copy of the periodical document from the electronic copy of the periodical document on a request of a customer in the predetermined print format for the periodical document.

Moreover, the present invention relates to a server arrangement for distribution of a periodical document, comprising processing means, memory means, the processing means connected to the memory means, the server arrangement being arranged to communicate with at least one publishing computer and at least one outlet computer arrangement, wherein the processing means are arranged to carry out the following steps:

to send data comprising an electronic copy of the periodical document to the at least one outlet computer arrangement wherein the electronic copy comprises the content of the periodical document and information of a predetermined print format for the periodical document.

Furthermore, the present invention relates to an outlet computer arrangement for distribution of a periodical document, comprising processing means, memory means, a printer, the processing means being connected to the memory means, the processing means being connected to the printer; the at least one outlet computer arrangement being arranged to communicate with the server arrangement, wherein the processing means are arranged to carry out the following steps:

to receive the data comprising the electronic copy of the periodical document from the server arrangement, wherein the electronic copy comprises the content of the periodical document and information of a predetermined print format for the periodical document, and to print by the printer a copy of the periodical document from the electronic copy of the periodical document on a request of a customer, in the predetermined print format for the periodical document.

Also, the present invention, relates to a computer program product, to be loaded by the server as described above, to provide the processing means of the server arrangement, with the capability:

to send data comprising an electronic copy of the periodical document to the at least one outlet computer arrangement, wherein the electronic copy comprises the content of the periodical document and information of a predetermined print format for the periodical document.

Further, the present invention relates to a computer program product, to be loaded by the at least one outlet computer as described above, to provide the processing means of the at least one outlet computer arrangement, with the capability:

to receive the data comprising the electronic copy of the periodical document from the server arrangement, wherein the electronic copy comprises the content of the periodical document and information of a predetermined print format for the periodical document, and to print by the printer a copy of the periodical document from the electronic copy of the periodical document on a request of a customer, in the predetermined print format for the periodical document.

Finally, the present invention relates to a data carrier of a computer program product as described above.

The system and method for distributing periodical documents thus allow a relatively inexpensive distribution of these documents (from one or more publishers).

Furthermore, the provided information in the document at the newsstand may always be up-to-date, since the system of the present invention provides the possibility to distribute newspaper editions on the basis of an hourly update round the clock (24 hours per day, 365 days per year).

BRIEF DESCRIPTION OF THE DRAWINGS

Below, the invention will be explained with reference to some drawings, which are intended for illustration purposes only and not to limit the scope of protection as defined in the accompanying claims.

BRIEF DESCRIPTION OF PREFERRED EMBODIMENT

Figure 1:
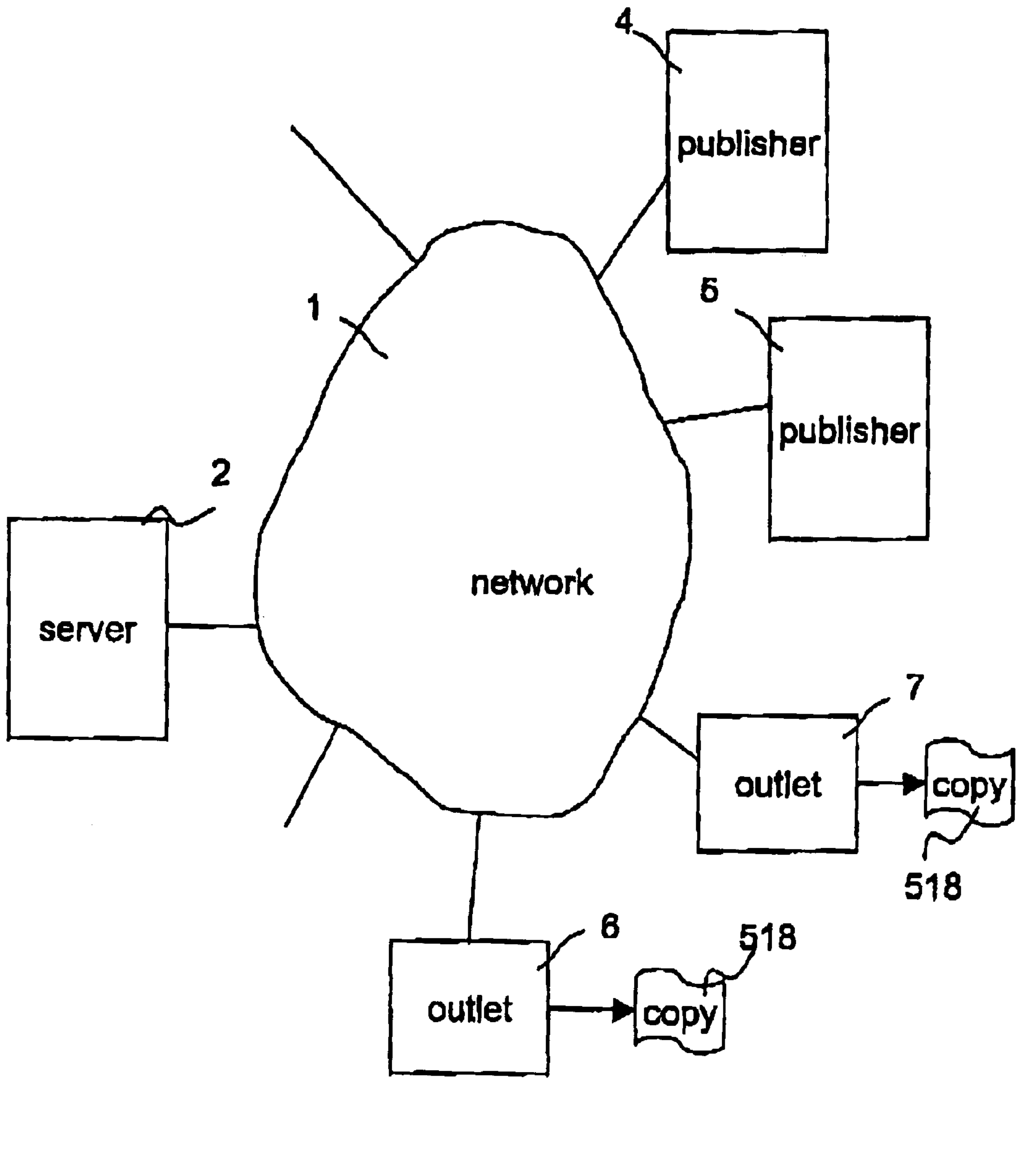
FIG. 1 shows schematically a system for distributing newspapers or periodicals according to the present invention.

FIG. 1 shows a general overview of the system according to this invention. A server arrangement 2 is connected to a network 1. The network 1 may comprise a plurality of interconnected networks, that may be the Public Switched Telephone Network (PSTN), or any other network suitable for data transmission. For instance such an interconnected network may be a Local Area Network (LAN), or a Wide Area Network (WAN), etc. The network 1 of the system, preferably, is a global network. It may use the network known as the Internet, but it may also use a private network, A plurality of computers 4, 5, 6, 7 of which four are shown in FIG. 1, is connected to the network 1, via suitable I/O means. Below, it will be assumed that computers 4, 5 are computer arrangements associated with content providers (publishers of newspapers and periodicals) and computers 6, 7 are computer arrangements associated with points of sale for newspapers and other periodicals (located at e,g., a hotel or an airport). Below, the computer arrangements 6, 7 associated with the points of sale will be referred to as outlet computers, which are capable to produce one or more hard copies 518 of a newspaper edition or an edition of a periodical.

Figure 2:
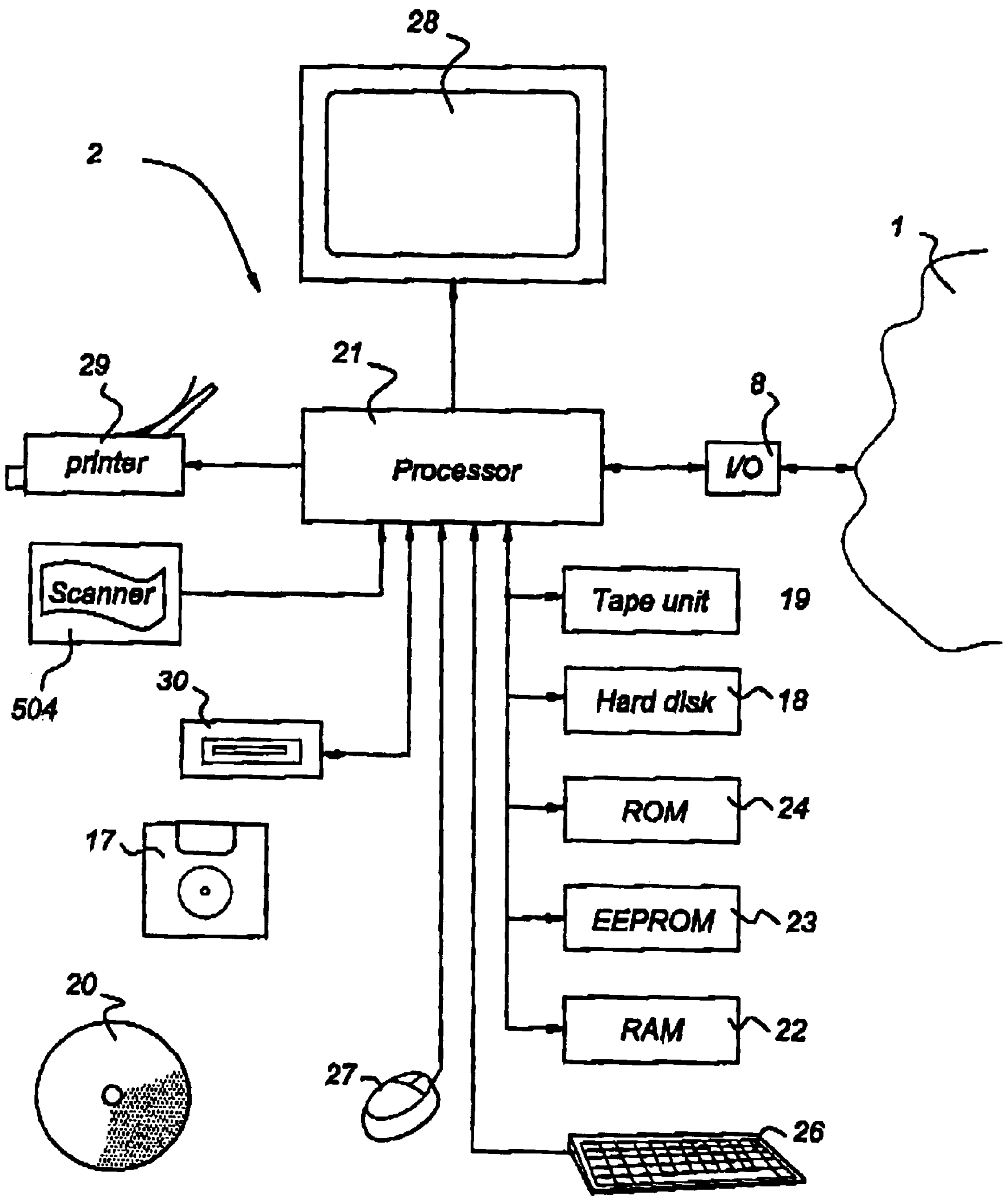
FIG. 2 shows schematically a server arrangement as used in a system according to the present invention.

FIG. 2 shows a general overview of a server arrangement 2 to illustrate the invention, comprising host processor means 21 with peripherals. The host processor means 21 are connected to memory units 18, 19, 22, 23, 24 which store instructions and data, one or more reading units 30 (to read, e,g., floppy disks 17, CD ROM's 20, DVD's, etc.), a keyboard 26 and a mouse 27 as input devices, and as output devices, a monitor 28 and a printer 29. Other input devices, like a trackball, a touch screen or a scanner, as well as other output devices may be provided. An input/output (I/O) device 8 is provided for data-communication over the network 1. The I/O device 8 is linked to the network 1. On the network 1, other computer systems (such as shown 4, 5, 6, 7) may be connected in a similar way as computer system 2.

The memory units shown comprise RAM 22,(E)EPROM 23, ROM 24, tape unit 19, and board disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remotely from one another, as is known to persons skilled in the art.

Figure 3:
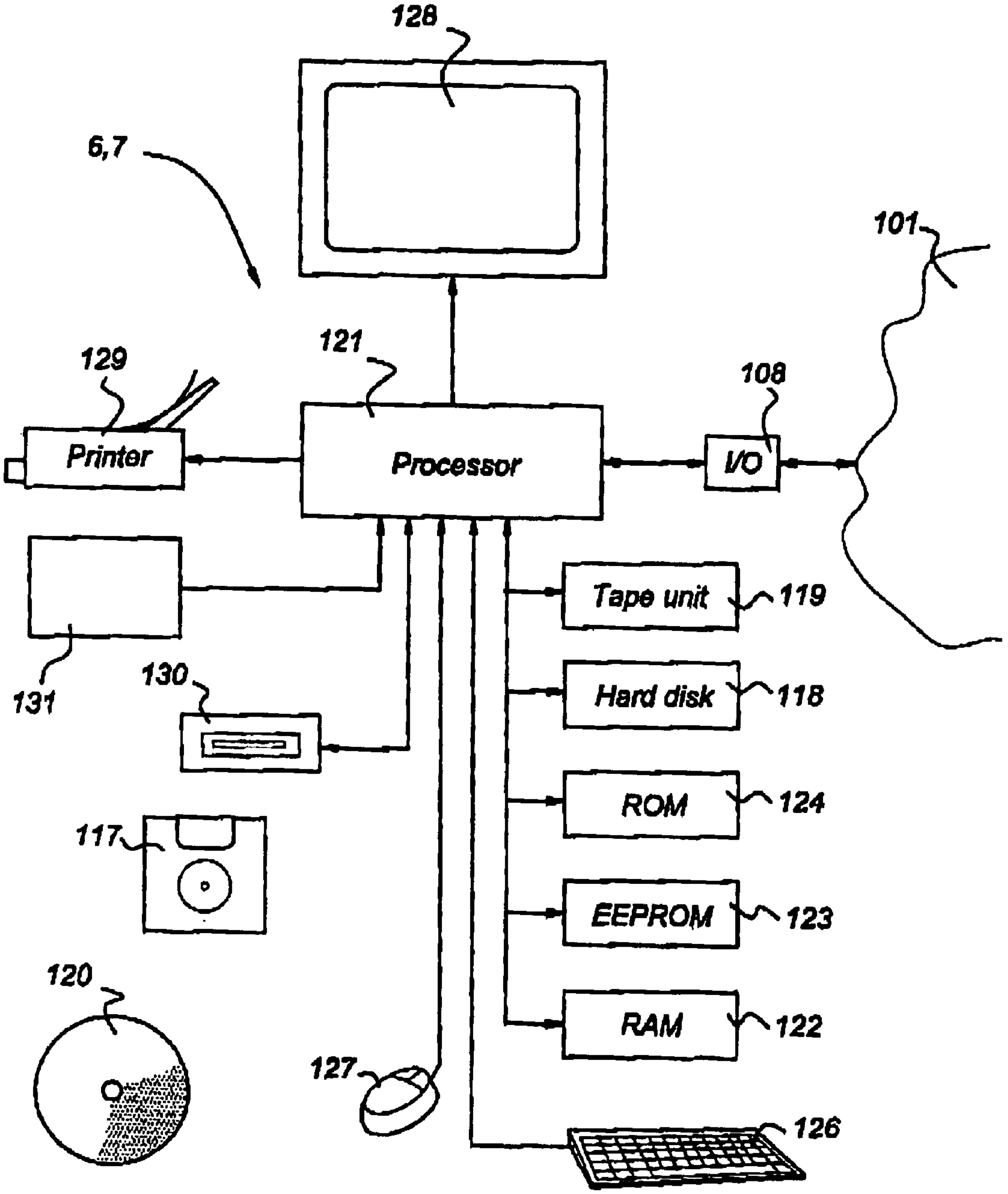
FIG. 3 shows schematically a client arrangement as in a system according to the present invention.

FIG. 3 shows a general overview of an outlet computer arrangement 6, 7 to illustrate the invention, comprising host processor means 121 with peripherals. The host processor means 121 are connected to memory units 118, 119, 122, 123, 124 which store instructions and data, one or more reading units 130 (to read e.g., floppy disks 17, CD ROM's 20, DVD's, etc.), a keyboard 126 and a mouse 127 as input devices, and as output devices, a monitor 128 and a printer 129. Other input devices, like a trackball, or a touch screen may be provided. An input/output (I/O) device 108 is provided for data-communication over the network 1. The I/O device 108 is linked to the network 1.

The memory units shown comprise RAM 122, (E)EPROM 123, ROM 124, tape unit 119, and hard disk 118. It should be understood that there may be provided more and/or other memory units known to persons skilled in the art. If required, one or more of them may be physically located remote from the processor means 121. The processor means 121 are shown as one box, however, they may comprise several processing units functioning in parallel or controlled by one main processor, that may be located remotely from one another, as is known to persons skilled in the art.

Since the outlet computer 6, 7 may be located at a remote location, the I/O device 108 may comprise a first device for wireless communication with a satellite network (as par of the network 1) to receive data. Further the I/O device 108 provides a second device which is connected to the network 1 for (two-way) transmission of data with the server arrangement 2. (For reasons of clarity, only one symbolic connection of the outlet computer 6, 7 to the network 1 is shown in FIG. 1. As will be explained later, the first network link is typically used to download newspaper content to the outlet computer 6, 7. The second network link is primarily used for system management functions.)

In the outlet computer arrangement 6, 7 of the present invention, the printer 129 is capable of printing documents in a paper size format suitable for newspapers or periodicals. Further input means 131 provided as a payment device. Such a payment device 131, preferably arranged for electronic payments, may comprise a card reader for reading electronic cards.

In the system of the present invention, newspapers and periodicals are to be distributed electronically in a predetermined format for printing in a specific newspaper format or periodical format, as will be explained in more detail below. By electronic distribution the disadvantages of prior art distribution of newspapers or periodicals to outlets which have a low sales volume and/or are remotely located, can be solved, Particularly, since publishers are already known to create editions electronically, the method of the present invention provides a simple way for world-wide distribution.

In the following figures the method to be carried out by the server arrangement 2 and the outlet computer 6, 7 is illustrated by a number of exemplary flow diagrams.

Figure 4:
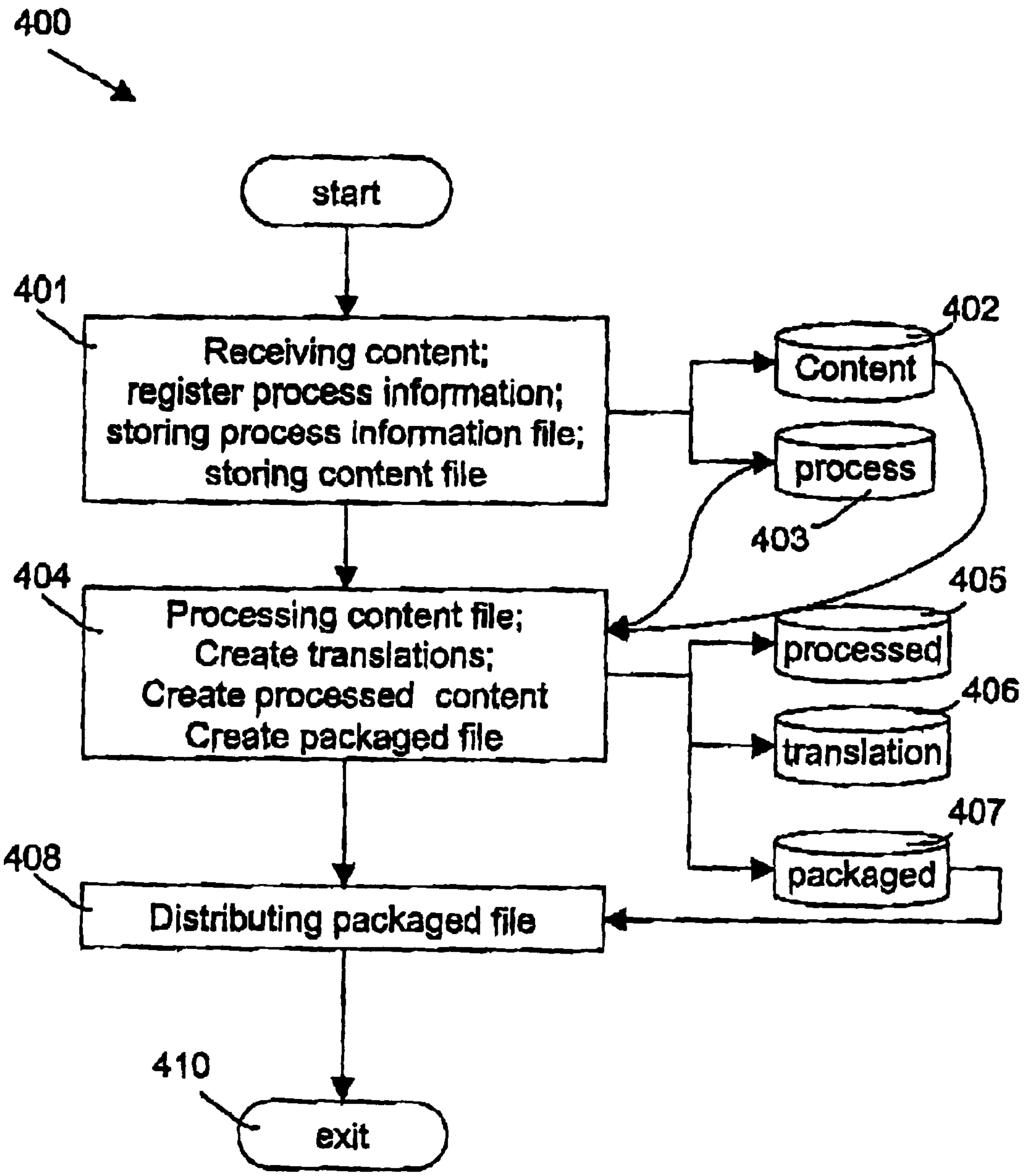
FIG. 4 shows a flow diagram for a distribution procedure of a newspaper or periodical to be carried out by the server arrangement according to the present invention.

FIG. 4 shows a flow diagram for a distribution procedure 400 of a newspaper or periodical to be carried out by the server arrangement according to the present invention.

In step 401, the processing means 21 of the server arrangement 2 receives, through the connection to the network 1, data comprising an electronic edition 402 of a newspaper or periodical from the computer 4, 5 of a publisher. The electronic edition comprises the content of the newspaper or periodical, and the predetermined print format of the document. The received data is stored in the memory means 18, 19, 22–24 of the server arrangement 2, preferably on hard disk 18. Since a plurality of publishers may provide electronic edition data to the system, the processing means 21 checks the identity of the sender and registers information related to the sender and the received content.

This information comprises e,g., information about the actual edition, an the destination addresses of the outlet computers 6, 7 (for example, which hotels and airports) to send the electronic edition to. This information file is stored in the memory means as process information 403 related to the received content 402. Possible errors in transmission are logged and content providers are notified of errors by electronic messaging.

The predetermined print format for a newspaper or periodical is provided by the publisher to obtain a well-defined print format, which will be the same at any given outlet, world-wide.

It is to be noted that a publisher may create several updated editions each day.

In step 404, the processing means 21 process the electronic edition file 402 according to the accompanying process information file 403. The processing may include file conversion, compression/decompression, national language support processing, verification of data and the logging of processing related errors. Possibly, in this step the processing also includes a formatting procedure for printing content of the electronic edition file 402 using the predetermined print format information.

From the content of the processing information file 403, the processing means 21 determines to which countries the electronic edition is to be sent. The national language support processing will provide a necessary translation of a menu to be shown to a customer during the procedure of selecting a newspaper at the outlet computer arrangement in step 506 of FIG. 5, which will be explained in more detail below. This translation is linked to the national language of the respective electronic edition.

A processed content file 405 is created which comprises the menu translation 406 and the electronic edition file 402.

Next, the processed content file 405 and the accompanying process information file 403 are packaged into one package file 407 and stored in the memory means 18, 19, 22–24 of the server arrangement 2.

In step 408, the processing means 21 of the server arrangement 2 transmit the packaged file 407 over the network 1 to the respective destinations according to the destination addresses in the process information file 403.

In step 410, the processing means 21 exit the procedure 400.

Further, it is to be noted that in procedure 400 other documents, which may also be relevant for distribution to the outlets, such as data files comprising commercial information, may be received from their respective publishers. In case, the processing means 21 also register processing information related to those particular files and are capable to process these other documents. For example, the content of such other documents may be displayed at the outlet computer 6, 7, while no newspaper selling procedure (to be explained below) is in progress.

Figure 5:
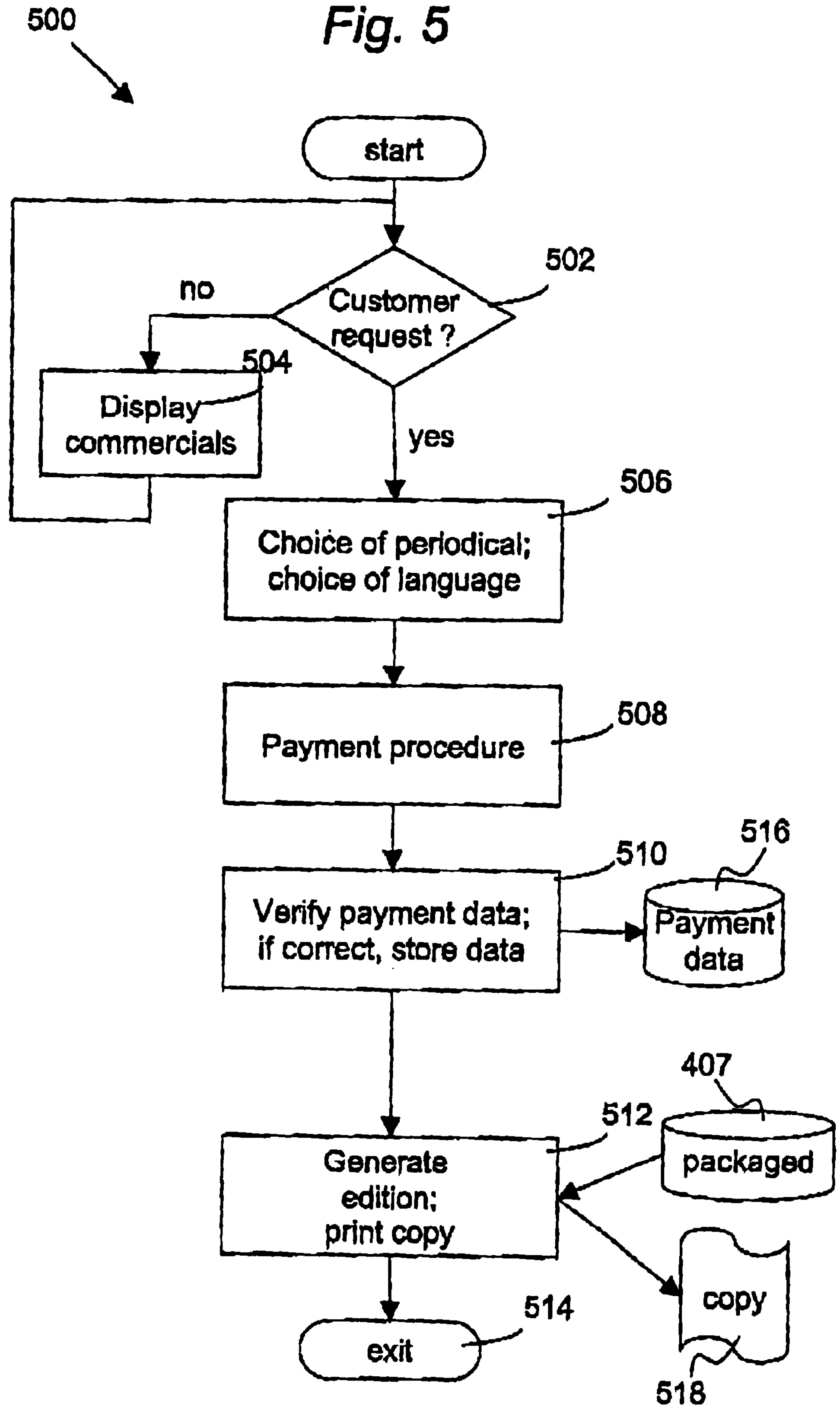
FIG. 5 shows a flow diagram for a selling procedure of a newspaper or periodical to be carried out by the client arrangement according to the present invention.

FIG. 5 shows a flow diagram for a selling procedure 500 of a newspaper to be carried out by the outlet computer arrangement 6, 7 according to the present invention.

The outlet computer 6, 7 is a standalone point of sale, where a customer can purchase a newspaper or a periodical. As described in step 408 of the procedure 400 shown in FIG. 4, from the server arrangement 2 a plurality of various electronic newspaper or periodical editions (contained in packaged files 407, and possibly a translation of the menu in the national language of the location of the outlet computer 6, 7) is downloaded to and stored in the memory means 118, 119, 122–124 of the outlet computer 6, 7. Preferably, the download procedure is done via a (dedicated) satellite-downlink connection for transmitting the packaged file 407. Such a satellite-downlink is capable of transmitting large amounts of data at a relatively high transmission rate, and provides sufficient capacity to download hourly updated newspaper editions to the outlet computer arrangement 6, 7 according to the present invention. As known to persons skilled in the art, such a downlink connection may also be established through a wired or wireless high speed connection, if available.

In step 502, the processing means 121 check for the input of a signal of the input devices 126, 127 whether a customer requires service. If so, the procedure continues in step 506, else step 504 is executed by the processing means 121.

In step 504, the processing means 121 read other documents stored in the memory means 118, 119, 122–124 and display their content on the display means 128. These other documents, as explained above, may comprise commercial information or any other applicable type of information, which can be displayed to the public during idle time.

In step 506, the processing means 121 generate one or more input screens for the customer to choose one of the available newspapers of periodicals. Also, the customer may choose his language of choice. Through the translation 406, the menus shown on the input screens may then be shown in the language selected by the customer, the national language of the location of the outlet computer 6, 7, or the language of the selected newspaper or periodical. The processing means 121 read the input values from the customer from the input devices and store these values in the memory means.

In step 508, the processing means 121 execute a payment procedure for the customer by entering his payment information into the payment device 131. For example, the customer is required to input his credit card into a card reader 131 and to enter a confirmation code on the card reader 131 or by using one of the input devices 126, 127. Alternatively, payment can be done in cash or by "electronic purse" (implemented by a smart card). When a credit card is used an automatic debit procedure related to a bank account, known as such, is used.

In step 510, the processing means 121 checks the payment related data entered by the customer in step 508, and the data of the order description (transaction-number, amount, currency), in a way as known to persons skilled in the art. If, in some way, the data are not correct, the processing means 121 may return to step 508 to repeat the payment procedure. If the data are correct, the payment related data are stored in a payment data file 516 in the memory means 118, 119, 122–124 of the outlet computer. Next, if the payment related data were correct, the processing means continue to execute step 512.

In step 512, the processing means 121 generate an electronic copy comprising the newspaper or periodical edition as chosen by the customer in the language chosen by the customer. The electronic document is extracted from the packaged file 407. After extraction, the electronic document is printed by the printer 129, which is capable of printing the newspaper or periodical edition in the predetermined print format (as defined in the content file 402) on paper 518.

In step 514, the processing means 121 exit the procedure 500.

Figure 6:
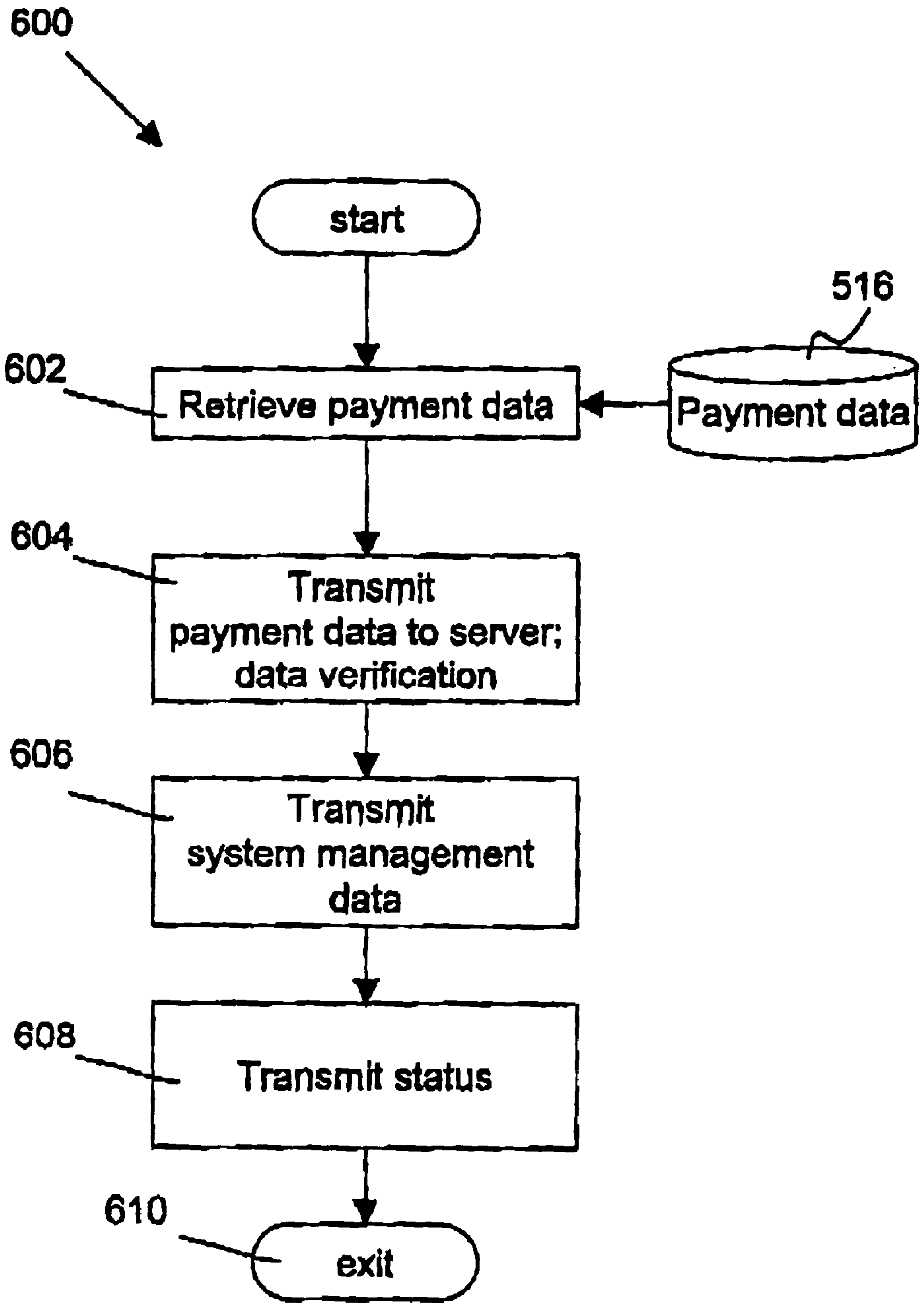
FIG. 6 shows a flow diagram for a procedure for sending financial transaction information to be carried out by the client arrangement according to the present invention.

FIG. 6 shows a flow diagram for a procedure 600 for sending financial transaction information, to be carried out by the outlet computer arrangement 6, 7 according to the present invention.

As described above in step 510 of procedure 500 (FIG. 5), the outlet computer 6, 7 stores all information on payments in the payment data file 516 in the memory means 118, 119, 122–124. After a given time-interval, the payment related data file 516, collected during that time, is transmitted to the server arrangement 2.

In step 602, the processing means 121 of the outlet computer retrieve the collected payment related data file 516 from the storage location in the memory.

In step 604, the processing means 121 transmit the collected payment related data over the network 1 to the server arrangement 2. Preferably, a data verification procedure (in a connection with the server 2) is applied to ensure the integrity of the transmitted data file.

In step 606, further data related to system management, such as data concerning sales, display of commercials are transmitted by the processing means 121 to the server 2.

In step 608, data related to the state of the outlet computer arrangement 6, 7 is transmitted to the server 2.

In step 610, the processing means 121 exit the procedure 600.

The data transmissions of procedure 600 are carried out via a second network connection of the outlet computer 6, 7 to the network 1, which connection is capable of handling two-way data-traffic.

Figure 7:
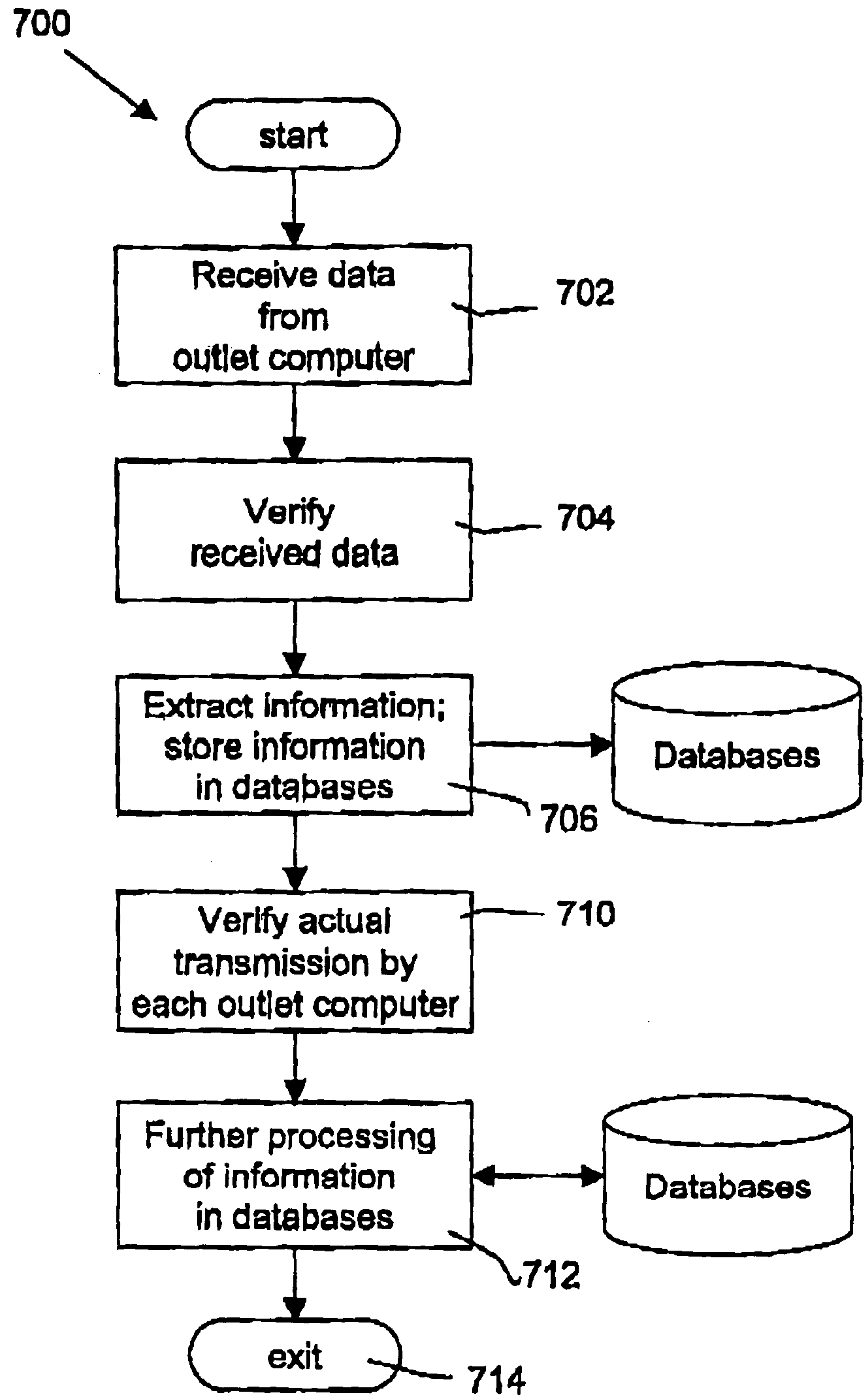
FIG. 7 shows a flow diagram for receiving financial transaction information from the client arrangement by the server arrangement according to the present invention.

FIG. 7 shows a flow diagram for a procedure 700 for receiving financial transaction information from an outlet computer 6, 7 by the server arrangement 2 according to the present invention.

In step 702, the processing means 21 of the server 2 receive data from an outlet computer 6, 7. These data comprise the payment related data file 516, system management data, and state related data as described with reference to FIG. 6.

In step 704, the processing means 21 verify the received data. If needed, a data verification procedure (in a connection with the respective outlet computer 6, 7) is started to ensure integrity of the data.

In step 706, the processing means 21 extract the relevant information from the received data. The information of the received payment related data file 516 is stored in a payment related database. System management data are stored in a system management database. Data concerning the state of outlet computers are stored in an application and components database. In FIG. 7, these databases are symbolically denoted as "Databases".

In step 710, the processing means 21 also monitors if each outlet computer 6,7 has actually transmitted data. The result of this check will be reported in the system management information.

In step 712, the processing means 21 process the received data to obtain information related to the distribution system, such as system management information, information for the respective newspaper publishers, information for the banking organizations that handle the payments, and information for the management of the locations where outlet computers 6, 7 are installed.

In step 714, the processing means 21 exit the procedure 700.

It is noted that the present invention can be used not only for newspapers, but also for periodicals, such as weekly and monthly magazines, and for other publicly available written documents.

In the present invention, the predetermined print format as defined in the content file 402 allows to print the documents mentioned above according to a well defined print format which is identical irrespective of the location where the document is printed.

Furthermore, it is noted that the present invention may also be applied for free printable documents. In that case, the payment procedure at the outlet computer arrangement 6, 7 may be omitted.

What is claimed is:

1. System for distribution of a periodical document to at least one outlet, comprising a server arrangement (2), at least one outlet computer arrangement (6, 7), said server arrangement (2) being arranged to communicate with said at least one outlet computer arrangement (6, 7) through a network (1), wherein said server arrangement (2) is arranged for sending data comprising an electronic copy of said periodical document to said at least one outlet computer arrangement (6, 7), said electronic copy comprises the content of said periodical document and information of a predetermined print format for said periodical document, and said at least one outlet computer arrangement (6, 7) is arranged for:

receiving said data comprising said electronic copy of said periodical document from said server arrangement (2), and printing a copy of said periodical document from said electronic copy of said periodical document using said predetermined print format for said periodical document, and wherein said at least one outlet computer arrangement (6, 7) is further arranged to carry out a payment procedure with a customer when a request is received from said customer, wherein said at least one outlet computer arrangement (6, 7) is further arranged to carry out the following steps:

to store the payment related data obtained in said payment procedure with said customer in the memory means (118, 119, 122–124) of said at least one outlet computer arrangement (6, 7) for sending to said server arrangement (2) at a later time, and to send said stored payment related data to said server arrangement (2) at said later time.

2. System for distribution of a periodical document, according to claim 1, wherein said server arrangement (2) is further arranged to carry out the following steps:

to receive said payment related data from said at least one outlet computer arrangement (6, 7);

to extract financial transactions data from said payment related data;

to transfer said financial transaction data to at least one banking organisation for handling of said financial transaction data.

3. A server arrangement (2) for distribution of a periodical document, comprising:

processing means (21), memory means (18, 19, 22–24), said processing means connected to said memory means, said server arrangement being arranged to communicate with at least one publishing computer (4,5) and at least one outlet computer arrangement (6,7), wherein said processing means (21) are arranged to carry out the following steps:

to send data comprising an electronic copy of said periodical document to said at least one outlet computer arrangement (6,7), wherein said electronic copy comprises the content of said periodical document and information of a predetermined print format for said periodical document, to receive data (402,403) comprising said electronic copy of said periodical document from a publishing computer (4, 5);

to register information data from said publishing computer (4, 5), said information data comprising data about an actual edition of said periodical document, and data about a location of said at least one outlet computer arrangement (6, 7) to distribute said periodical document to; and to apply national language support operations to said electronic copy of said periodical document to produce a translation of one or more menus to be shown to a customer during the selection step of a periodical document (506, 508, 510, 512), said translation being in a national language of the location of said at least one outlet computer arrangement (6, 7), in the national language of choice of the customer, or the national language of the periodical document.

4. The server arrangement of claim 3, further comprising a computer program product, to be loaded by said processing means to perform the steps of claim 3.

5. Outlet computer arrangement (6,7) for distribution of a periodical document, comprising processing means (121), memory means (118, 119, 122–124), a printer (129), said processing means (121) being connected to said memory means, said processing means (122) being connected to said printer (129); said at least one outlet computer arrangement being arranged to communicate with a server arrangement (2), wherein said processing means (121) are arranged to carry out the following steps:

to receive said data comprising said electronic copy of said periodical document from said server arrangement (2), wherein said electronic copy comprises the content of said periodical document and information of a predetermined print format for said periodical document;

to print by said printer (129) a copy of said periodical document from said electronic copy of said periodical document on a request of a customer, in said predetermined print format for said periodical documents;

to carry out a payment procedure with said customer when said request is received from said customer; and to store the payment related data obtained in said payment procedure with said customer in the memory means (118,119,122–124) of said at least one outlet computer arrangement (6,7) for sending to said server arrangement (2) at a later time, and to send said stored payment related data to said server arrangement (2) at said later time.

6. The outlet computer arrangement of claim 5, further comprising a computer program product, to be loaded by said processing means to perform the steps of claim 5.

* * * * *